Patented Apr. 24, 1934

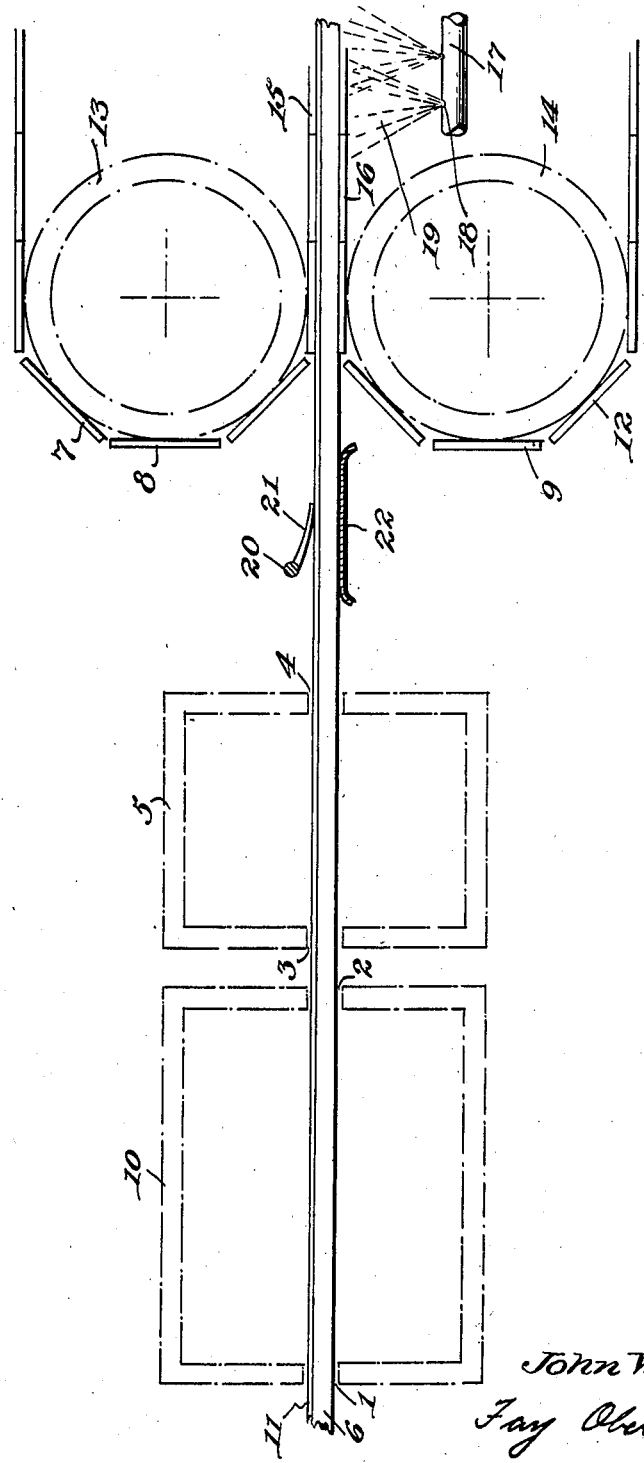

1,956,470

UNITED STATES PATENT OFFICE 1,956,470

BEARING MANUFACTURE

John V. O. Palm, Cleveland Heights, Ohio, assignor to The Cleveland Graphite Bronze Company, Cleveland, Ohio, a corporation of Ohio Application February 16, 1931, Serial No. 515,983

2 Claims. (Cl. 29—149.5)

This invention, relating, as indicated, to bearing manufacture is more particularly directed to a novel method of producing journal bearings, as distinguished from ball and roller bearings.

Ordinarily, the housings which receive bearings are castings and the bearing material which may be babbitt is poured against the housing, this process being quite costly because of the fact that the babbitt must be of considerable thickness, due to the irregularity of the cast housing surface, and also because the housings are sometimes of relatively large proportions, and placing them in a position to line with babbitt is an expensive and awkward process. The thick layer of babbitt in such bearings of the prior art is also objectionable because babbitt is soft and a thick layer is subject to distortion from radial pressure more easily than a thin lining of babbitt backed with hard material.

A second well known method, which has supplemented to a large extent the above mentioned pouring method, in the bearing industry is to line a thick layer of brass with babbitt, but the resulting bearing is very expensive because of the cost of the brass. It has been found that steel may be lined with babbitt or bronze, and that the thickness of the steel as compared with that of the brass may be materially reduced. The resulting bearing is very cheap to produce as far as the materials are concerned, but the problem is how to unite these two metals, which have such different properties, so that the cost of such union plus the cost of materials is less than the total cost of a lined housing or a lined brass backed bearing. I have found that either bronze, or babbitt, or other suitable bearing material in the form of strips may be united to steel, and that this thickness of the babbitt or equivalent bearing material may be materially reduced and yet such a bearing will outlast a thick, cast bearing, and in the event of replacement the cost is only a fraction of what it would be under former conditions.

A further and important objection to replacing worn out bearing by casting is that the process of casting, being carried out in small shops under all sorts of conditions, produces a bearing lining the structure of which is far from uniform as compared to a lining produced in the factory under controlled conditions, where the bearing has a structure of just the desired character. This will be appreciated by taking the main bearing of an automobile, for example, which is usually cast in the block. If this bearing becomes worn the block has to be taken out, all the old babbitt removed, and then the bearing housing is cast with babbitt. With the use of my improved thin wall bearings all of this labor is avoided and the cost of material is less, since part of the space which was formerly occupied by babbitt, a very expensive material, is now taken up by steel. The reference to the use of my bearing in an automobile is only intended as a means of illustration and I do not wish to be limited to the use of my improved bearing in automobiles.

The invention involved herein employs both heat and pressure in various degrees to effect the bonding of a strip of babbitt to a strip of steel. The invention further embodies the uniting of a strip of steel to a strip of babbitt without the use of any intermediate adhesive material such as solder or tin. The processes now in vogue in the manufacture of bearings are mainly processes in which steps occur, that is, for instance, the shell is heated and then transferred to another point of operation where it is coated, etc. In my process all of the steps are combined into one continuous operation, thus making possible an enormous saving in operating costs as well as producing a better bearing.

I have found that strips of babbitt may be united to strips of steel, without the aid of solder or equivalent bonding agents by heating the strips to a temperature just below the flowing temperature of the babbitt, and then increasing the temperature and applying pressure. In some instances, very good results have been obtained by increasing the pressure in the same manner as the heat.

It will be noted that I have used the terms, "solder", "steel" and "babbitt" but this is merely for purposes of illustration, as other metals may be obviously substituted.

The annexed drawing and the following description set forth in detail one method and certain mechanism embodying the invention, such disclosed method and means constituting, however, but one of various mechanical forms in which the principle of the invention may be used.

In said annexed drawing:—

The figure is a side elevation view.

Referring now to the drawing, a primary heating chamber is shown at 10, which is relatively long in order to impart a high degree of heat since the material entering this chamber is at a normal temperature. This chamber has an entrance 1 and an exit 2 which are in the same horizontal plane, thus providing a means of free passage for a strip of steel 6 having superimposed thereon a strip of babbitt. Immediately adjacent the primary chamber 10 a secondary heating chamber 5 is illustrated, which need not be of such lengthy construction because of the fact that its purpose is to raise the temperature of babbitt slightly. This chamber is provided with openings 3 and 4 for the same purpose as openings 1 and 2 of the chamber 10.

I have shown and described two furnaces as the best method of obtaining an increase in temperature, but obviously one furnace may be used instead of two. If the construction is used it will necessitate means within the furnace to provide different temperatures in different parts thereof, and also might necessitate that the one furnace be too long.

A means of initially pressing the strips together is shown at 21 and consists of a shaft 20 having a plate 21 affixed thereto, said plate being of spring metal so that rotation of the shaft increases the pressure on the babbitt strip 11. A support 22 is shown beneath the initial pressing means which receives the thrust of the plate 21 and maintains the strips in the same horizontal plane. A second pressing means is shown, said means being termed a pressure belt. Briefly stated, the pressure belt consists of two metallic belts, one placed above the other, the lower one receiving a thrust exerted upon the upper belt, belts consisting of plates as shown at 7 and 8, which are connected together and revolve about two sprockets, one of which is shown at 13. The lower belt is similarly constructed and consists of plates 9 and 12 movably held together the whole belt revolving about two sprockets, only one of which is shown at 14. Approximately midway between the sprockets a means of spraying the lower belt with a cooling fluid is situated, said means consisting of a fluid spray line 17 having openings 18 therein from which a spray 19 is ejected.

The method of manufacturing bearings according to my improved process is as follows:

Two strips, one of steel and one of babbitt, are lead into a heat chamber where they are heated to a temperature just below the flowing temperature of the babbitt. They are then passed through another furnace or heat chamber which is maintained at a slightly increased temperature over the first named chamber, after which the strips are immediately pressed together but with a pressure that is not sufficient in itself to bond the strips together. The strips are now joined together and the bond has received a slight set, whereupon the strips are fed into the pressure belt which exerts a very heavy pressure upon them and at the same time moves them and draws the assembly through both heat chambers and the primary pressure means. Before the strips have traveled the full length of the pressure belt they are cooled in such a manner that the bond is not injuriously affected but rather increased. Such cooling is accomplished by means of a spray upon the lower belt which necessitates lowering of the temperature of the belt and then before any cooling action is obtained at the bond, the temperature of the steel must be lowered.

From this description it will be obvious that my process is a continuous one, saving greatly both labor and machinery costs and producing a better bearing because in a continuous operation dirt, oil and oxidation cannot retard the bonding of the component layers as in present day methods. A further advantage will be seen in that no bonding agent is required which represents a saving in the cost of material itself, as well as the labor and equipment necessary to introduce such solder into the process. After the strips have been maintained under the increased pressure for an interval sufficient to bond them they are chilled and are now ready for blanking into the desired size and formed into bearings.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In the manufacture of bearings, the steps which comprise superimposing a strip of babbitt upon a strip of steel, heating the assembled strips until the babbitt is plastic, slightly raising the temperature of the strips, applying relatively light pressure to said strips, applying heavy pressure to said strips chilling said strips while under pressure to form a strip of integrally united bearing material without the aid of solder or equivalent bonding agents and then blanking the resulting composite strip and forming it into bearings.

2. In the manufacture of bearings, the steps which comprise heating strips of bearing backing material and babbitt in superposed contacting relation, to a temperature just below the flowing temperature of the babbitt, subjecting said strips to an increase in temperature, pressing said strips together, and then chilling said strips while under pressure to form a strip of integrally united bearing material without the aid of solder or equivalent bonding agents.

JOHN V. O. PALM.